United States Patent
Tanaka

(10) Patent No.: US 9,620,143 B2
(45) Date of Patent: Apr. 11, 2017

(54) VEHICLE-TO-VEHICLE COMMUNICATION DEVICE

(71) Applicant: DENSO CORPORATION, Kariya, Aichi-pref. (JP)

(72) Inventor: Satoru Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 311 days.

(21) Appl. No.: 13/746,525

(22) Filed: Jan. 22, 2013

(65) Prior Publication Data

US 2013/0191132 A1    Jul. 25, 2013

(30) Foreign Application Priority Data

Jan. 24, 2012    (JP) .................................. 2012-11974

(51) Int. Cl.
| | | |
|---|---|---|
| G10L 21/06 | (2013.01) | |
| G10L 15/26 | (2006.01) | |
| G08G 1/0967 | (2006.01) | |
| G01C 21/36 | (2006.01) | |

(52) U.S. Cl.
CPC .......... *G10L 21/06* (2013.01); *G01C 21/3608* (2013.01); *G01C 21/3629* (2013.01); *G08G 1/096791* (2013.01); *G10L 15/26* (2013.01)

(58) Field of Classification Search
CPC ... G10L 21/06; G10L 15/26; G08G 1/096791; G01C 21/3608; G01C 21/3629
USPC ..... 704/275, 201, 257, 9; 370/342; 380/270; 342/52; 701/45, 117, 301
See application file for complete search history.

(56) References Cited

U.S. PATENT DOCUMENTS

| | | | | |
|---|---|---|---|---|
| 5,668,880 A | * | 9/1997 | Alajajian ............... | H04B 1/707 370/335 |
| 6,765,495 B1 | * | 7/2004 | Dunning ................ | G08G 1/161 340/435 |

(Continued)

FOREIGN PATENT DOCUMENTS

| | | |
|---|---|---|
| JP | H09-210699 A | 8/1997 |
| JP | 2001-144850 A | 5/2001 |

(Continued)

OTHER PUBLICATIONS

Japanese Office Action issued on Dec. 1, 2015 in the corresponding JP application No. 2012-011974 (English translation attached).

(Continued)

*Primary Examiner* — Pierre-Louis Desir
*Assistant Examiner* — Seong Ah A Shin
(74) *Attorney, Agent, or Firm* — Posz Law Group, PLC

(57) ABSTRACT

A vehicle-to-vehicle communication device generates voice information that includes a voice message and added information regarding an output of the voice message. The voice information is transmitted in one direction of a subject vehicle via a transmission unit, and voice information from another vehicle is received via a reception unit. The vehicle-to-vehicle communication device plays the voice message of the voice information received by the reception unit based on the added information of the voice information. In such manner, information regarding a travel situation is appropriately transmitted by the vehicle-to-vehicle communication device.

15 Claims, 4 Drawing Sheets

(56) References Cited

U.S. PATENT DOCUMENTS

| | | | |
|---|---|---|---|
| 7,865,370 B2* | 1/2011 | Cormack | H04H 60/37 |
| | | | 704/251 |
| 2004/0116106 A1 | 6/2004 | Shishido et al. | |
| 2005/0192730 A1* | 9/2005 | Churchill | G08G 1/164 |
| | | | 701/45 |
| 2007/0111672 A1* | 5/2007 | Saintoyant | H04W 76/023 |
| | | | 455/73 |
| 2007/0162550 A1* | 7/2007 | Rosenberg | H04L 12/581 |
| | | | 709/206 |
| 2008/0167821 A1* | 7/2008 | Breed | G08G 1/161 |
| | | | 701/301 |
| 2010/0145700 A1* | 6/2010 | Kennewick | G06F 17/30654 |
| | | | 704/257 |
| 2010/0279647 A1* | 11/2010 | Jacobs | H04W 4/22 |
| | | | 455/404.1 |
| 2012/0034905 A1* | 2/2012 | Stahlin | G08G 1/205 |
| | | | 455/414.1 |
| 2012/0323474 A1* | 12/2012 | Breed | B60W 30/04 |
| | | | 701/117 |
| 2013/0229289 A1* | 9/2013 | Bensoussan | B60Q 5/006 |
| | | | 340/902 |
| 2014/0022108 A1* | 1/2014 | Alberth, Jr. | G01S 13/04 |
| | | | 342/52 |
| 2014/0066132 A1* | 3/2014 | Burke | H04L 67/12 |
| | | | 455/569.2 |
| 2014/0303966 A1* | 10/2014 | Adachi | H04M 1/6075 |
| | | | 704/201 |

FOREIGN PATENT DOCUMENTS

| | | |
|---|---|---|
| JP | 2005-234921 A | 9/2005 |
| JP | 2007-148524 A | 6/2007 |
| JP | 2009-085697 A | 4/2009 |
| JP | 2009-237944 A | 10/2009 |
| JP | 2010-183268 A | 8/2010 |
| JP | 2010-224301 A | 10/2010 |

OTHER PUBLICATIONS

Office Action mailed Mar. 24, 2015 issued in corresponding JP patent application No. 2012-011974 (and English translation).

\* cited by examiner

US 9,620,143 B2

VEHICLE-TO-VEHICLE COMMUNICATION DEVICE

CROSS REFERENCE TO RELATED APPLICATION

The present application is based on and claims the benefit of priority of Japanese Patent Application No. 2012-11974, filed on Jan. 24, 2012, the disclosure of which is incorporated herein by reference.

TECHNICAL FIELD

The present disclosure generally relates to a vehicle-to-vehicle communication device for transmitting and receiving information among vehicles.

BACKGROUND

Conventionally, it is well-known in the art that a vehicle-to-vehicle communication device is used for exchanging information among vehicles. Such communication device may, for example, send a message from a subject vehicle to the other vehicles while traveling, which is disclosed in Japanese Patent Laid-Open No. 2005-234921 (JP '921).

The message transmitted from the subject vehicle may contain various information that is based on a condition or situation of the subject vehicle. However, the conventional vehicle-to-vehicle communication device such as the one disclosed in JP '921, may not be capable of transmitting the message, due to the limitation of the message that is prescribed by the device. Such limitation may be avoided by preparing many messages suitable for various situations. However, preset and predefined messages may cause other limitations and/or problems, since all possible situations can not possibly be covered by the prepared messages, and searching for or making a message while driving the vehicle will pose a serious safety hazard for the vehicle and its occupant.

SUMMARY

A vehicle-to-vehicle communication device transmits and receives information to and from another vehicle. The vehicle-to-vehicle communication device includes a voice input unit, a voice information generation unit, a transmission unit, a reception unit, and a sound output unit.

The voice input unit generates a voice message based on a user's utterance. The voice information generation unit generates a voice information that includes the voice message from the voice input unit and added information, which provides details regarding the output of the voice message.

The transmission unit transmits the voice information generated by the voice information generation unit in one direction of the vehicle, and the reception unit receives the voice information transmitted by the transmission unit of another vehicle. Based on the added information of the voice information received by the reception unit, the sound output unit outputs the voice message provided in the voice information received.

Accordingly, the voice information is generated based on a voice message that is formulated from an utterance of a speaker (e.g., a driver). In other words, the voice information to be transmitted to the other vehicle is generated without, for example, an input operation for inputting a text or character by the driver. Further, the voice message is, by itself, the desired contents to be transmitted from a sender of the information. Thus, there is no need for the driver to search for an appropriate message in a database of prepared messages nor does the driver need to gaze at a display unit to input text and character. As a result, the vehicle-to-vehicle communication device transmits appropriate information suitable for a travel situation of the vehicle without causing safety issues, thereby improving the safety of the driver and the vehicle.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

A vehicle-to-vehicle communication device is described with reference to the drawings. In the present embodiment, a user of the device is assumed to be a vehicle driver.

Figure 1:
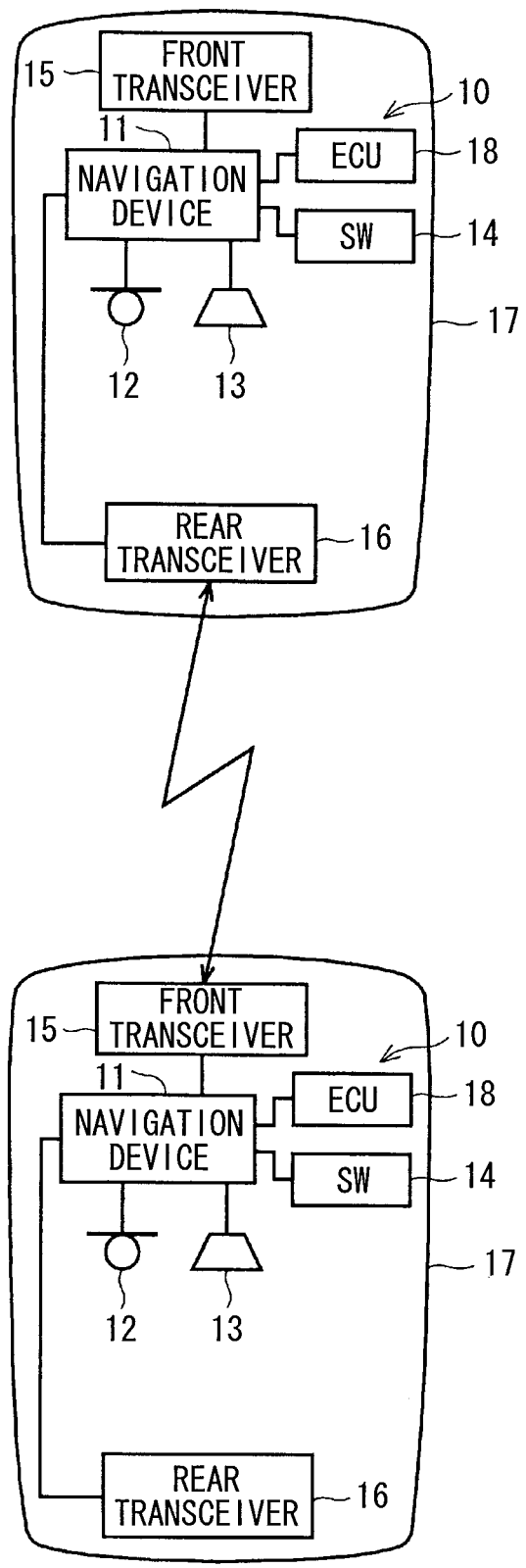
FIG. 1 is a block diagram of a vehicle-to-vehicle communication device of the present disclosure.

As shown in FIG. 1, a vehicle-to-vehicle communication device 10 includes a navigation device 11, a microphone 12, a speaker 13, a switch (SW) 14, a front transceiver 15 and a rear transceiver 16.

Further, the vehicle-to-vehicle communication device 10 described serving as a navigation device 11 may be fixedly installed in a vehicle 17 or movably installed or removable in the vehicle 17. In the following description, a lead vehicle 17 has the vehicle-to-vehicle communication device 10 and is in front of a subject vehicle 17, which also has the vehicle-to-vehicle communication device 10. Similarly, a following vehicle 17 also has vehicle-to-vehicle communication device 10 and is positioned behind (i.e., following) the subject vehicle 17.

The navigation device 11 has well-known navigation functions, such as a route guidance function and a map matching function, and includes various components, such as a control unit, a display unit, a GPS unit, and a map database (none shown). The control unit of the navigation device 11 is implemented as a microcomputer that includes, for instance, a CPU, a ROM, and a RAM. The control unit controls the entire operation of the navigation device 11 according to a program stored by the ROM. Further, the control unit performs a process to generate voice information and a process to identify the voice information, and may, therefore, by referred to as a voice information generation unit in claims.

In the present embodiment, the voice information generation unit is realized as a software process by a program executed in the CPU. Further, the navigation device 11 has a function that realizes a hands-free call when the device 11 is connected to a mobile communication terminal.

The display unit of the navigation device 11 may be, for example, a display device such as a liquid crystal display or an organic electroluminescence display. The display unit displays information, such as a map screen, a guidance route, and various operation menus. Further, the display unit displays information about the voice information received by the communication device 10. The display unit may serve as a notification unit in claims.

The navigation device 11 is capable of performing a sound recognition process to recognize a sound input from the microphone 12 for recognizing words spoken by the driver (i.e., speech recognition). In such manner, the vehicle driver is enabled to operate the navigation device 11 by voice (i.e., operation of the navigation device 11 by a voice command). In other words, the vehicle driver can use the navigation device 11 safely while driving the vehicle (i.e., while the vehicle is traveling) with no safety hazard.

Further, the navigation device 11 outputs a sound and/or a voice (i.e., a voice guidance), such as a reply for the voice command or a route guidance from the speaker 13. The navigation device 11 outputs a voice guidance to guide an operation method from the speaker 13. Therefore, the navigation device 11 allows the user to use its functions through a voice input interface for the convenience of the user, because the user can use the functions during the travel of the vehicle without having to remember all the details of the operation procedures or the like.

The microphone 12 may serve as a voice input unit in claims, and the speaker 13 may serve as a sound output unit and a notification unit in claims.

The navigation device 11 has multiple operation switches around the display unit or on a screen of the display unit (i.e., touch switches). The voice input interface of the navigation device 11 is started by the operation of such operation switches. More practically, the voice input interface is started by an operation of a push to talk (PTT) switch.

The navigation device 11 is coupled to a push button type switch, or a SW 14. The SW 14 is provided on a steering wheel. The SW 14 allows the vehicle driver to operate the SW 14 without separating his/her hand from the steering wheel. The SW 14 detects a press time (i.e., a time during which the SW 14 is pressed). For instance, a press time may be provided as a long press (i.e., a press and hold) and a short press. The SW 14 may serve as an operation input unit in claims.

The voice information includes main information to be notified to the driver of the other vehicle, or the spoken words (i.e., voice message hereinafter) by the driver of the subject vehicle, and added information regarding how the voice message should be output. The added information regarding the output of the voice message may be information regarding, for example, (i) a situation in which the driver spoke the message or (ii) the intention of the driver at a time of speaking the voice message.

The control unit of the navigation apparatus 11 (i.e., a voice information generation unit) converts, by performing a signal process, the voice message from the driver into data having a certain data format to allow a receiving vehicle 17 (i.e., a receiving side) to play the voice message. The voice message is converted to have a text data format after such conversion. Therefore, on the receiving side, the voice message is provided (i.e., played) by a text-to-speech function that is generally provided for the navigation device 11. In other words, the voice information includes the voice message having a text data format.

When the driver would like to transmit information, the driver usually transmits the information for a certain reason. For example, informing a driver of the lead vehicle 17 about a burned-out taillight or for greeting a driver of the following vehicle 17 about the grace of letting the subject vehicle into a traffic, i.e., in front of the following vehicle when changing lanes or merging from a ramp road. In such case, the driver of the subject vehicle may or may not want the information to be quickly conveyed. Thus, the vehicle-to-vehicle communication device 10 sets information regarding the messaged situation as the added information, which is to be transmitted as part of the voice information as text data representing the voice.

The added information set by the vehicle-to-vehicle communication device 10 specifies a play timing at which to play the voice message of the transmitted voice information, and a safety attribute regarding whether the voice message indicates a safety related matter of the vehicle 17. The play timing is recited as an output timing in claims for outputting a voice from the sound output unit on the receiving side. The play timing may be specified by a priority level. For instance, a high priority level conveys an urgency of the driver of the sending vehicle 17 (i.e., sending side), requesting an immediate play of the voice message, a middle priority level conveys a notice of the driver on the sending side, requesting a play of the voice message but not necessarily at a moment of reception, and a low priority level conveys a for your information type message of the driver on the sending side, allowing the receiver to play the voice message at their leisure.

The high priority level situation may be, for example, the subject vehicle's 17 (i.e., the sender) intention of decelerating, which may immediately affect the travel of, for example, the following vehicle 17 and the subject vehicle 17. The high priority level situation may also be an unnecessary continuation of a blinker operation or an unnecessary continuation of a hazard lamp operation, which is to be immediately corrected by an action of the driver on the receiving side.

The middle priority level situation may be an open trunk, which may affect the travel of the vehicles 17, but may not be corrected immediately. The low priority level situation may be providing a greeting to a receiver vehicle, which will not immediately affect the travel of the vehicles.

The safety attribute indicates whether the transmitted information is regarding the safety of the vehicle, and is provided in a different category from a priority category, which is about the priority level of the transmitted information, to improve the user's convenience.

The safety attribute provides information about a situation that is observed in regards to the vehicle 17, such as a tire puncture or a truck load that is about to fall off. In such a situation, though the driver of the receiving side may not immediately be able to address the situation, the situation may possibly affect both of the receiving side vehicle 17 and its following vehicles 17. On the other hand, a greeting to the receiving side vehicle 17 does not affect the safety of the receiving vehicle 17, and additional information may not be provided. Accordingly, the safety attribute indicates, for example, a situation in which an immediate attention of the receiving side driver may be required or situation in which the law is being violated. By setting the safety attribute in the added information and by transmitting such information, the attention of the driver of the receiving vehicle 17 is immediately drawn to such situation.

The priority level and the safety attribute of the added information may be closely related. For example, the situation of a truck load that is about to fall off is considered to be categorized as both a high priority level situation and a safety attribute situation. Accordingly, the added information may have settings for both of the two categories, i.e., for the play timing and for the safety attribute, at the same time.

The front transceiver 15 is provided on a front part of the vehicle 17, and transmits the voice information generated toward a front field of the vehicle 17 and receives the voice information transmitted from a front field of the vehicle 17. In other words, the front transceiver 15 has a frontward directivity regarding information transmission and reception of the vehicle 17.

The rear transceiver 16 is provided on a rear part of the vehicle 17, and transmits the voice information generated by the control unit of the navigation device 11 to a rear field of the vehicle 17 and receives the voice information transmitted from a rear field of the vehicle 17. In other words, the rear transceiver 16 has a rearward directivity regarding information transmission and reception of the vehicle 17.

The front transceiver 15 and the rear transceiver 16 may respectively serve as a transmission unit and a reception unit in claims. Further, "in one direction of the vehicle" in claims indicates one of a front direction and a rear direction of the vehicle.

Figure 2:
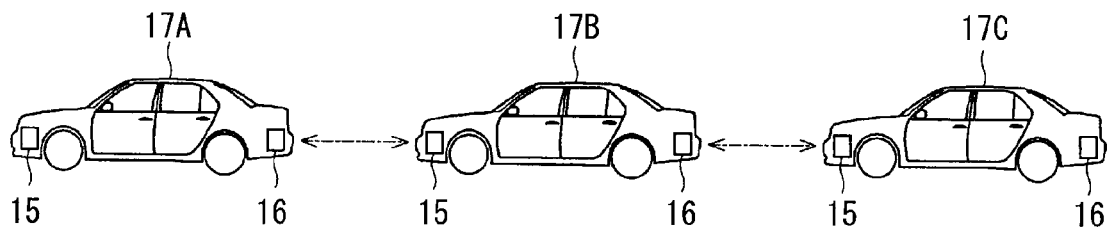
FIG. 2 is an illustration of an installation position of a transmission unit and a reception unit of the vehicle-to-vehicle communication device.

The voice information is transmitted to one of a front direction and a rear direction of the vehicle 17, which is set by a transmission time. In such case, the voice information is transmitted without having a destination specified therein, such as the receiving vehicle 17. Thus, the front transceiver 15 is positioned substantially at a height of a license plate on the front part of the vehicle 17 (FIG. 2), which allows the transmission of the voice information toward the front field of the vehicle 17 and allows the reception of the voice information therefrom.

The rear transceiver 16 is positioned substantially at a height of a license plate on the rear part of the vehicle 17, which allows the transmission of the voice information toward the rear field of the vehicle 17 and allows the reception of the voice information therefrom. Thus, when a vehicle 17C transmits the voice information toward the front field of the vehicle, the voice information reaches a vehicle 17B, but does not reach a vehicle 17A, due to the interception by the vehicle 17B. Likewise, when the vehicle 17A transmits the voice information toward the rear field of the vehicle, the voice information only reaches the vehicle 17B, but does not reach the vehicle 17C, due to the interception by the vehicle 17B.

Both of the front transceiver 15 and the rear transceiver 16 are configured to transmit the voice information in a transmission range of several dozen meters, and the transmission range is configured to be variable (i.e., the transmission range of the voice information is adjustable). For example, the transmission range for highways can be set to 50 meters or more, which is usually the inter-vehicle distance recommended for highway travel, and the transmission range for local roads can be set to several meters, which is usually the inter-vehicle distance recommended for local road travel.

Therefore, the transmission range of the front transceiver 15 and the rear transceiver 16 may be adjusted to an appropriate value based upon, for example, a vehicle speed and a traffic condition. Such information may be received from an ECU coupled to the navigation device 11 or may be calculated by the navigation device 11. The front transceiver 15 and the rear transceiver 16 respectively adjust the transmission output and/or the reception range according to an instruction from the navigation device 11 depending upon the vehicle speed and the traffic condition. In addition, though the ECU 18 is shown in FIG. 1 as only one piece of device, the navigation device 11 is coupled to multiple ECUs 18 for receiving information regarding the vehicle 17 from each of the ECUs 18.

The operation of the vehicle-to-vehicle communication device 10 is described in the following.

Currently, communication between vehicles may be made by, for example, a blow of a horn, an operation of a blinker, or a flash of a high-beam lamp, which cannot convey the spirit of or reason for the action, or provide detail. Further, the blow of the horn or the flashing of the high-beam lamp may be interpreted differently from the operator's intention, and may cause trouble. The conventional vehicle-to-vehicle communication device has a limited number of preset messages, which are predefined and cannot be changed, thereby restricting the variety of messages and not accurately capturing the condition in which the message was sent.

Therefore, the navigation device 11 in the present embodiment enables a variety of voice message that conveys the reason behind the voice message through the vehicle-to-vehicle communication in the form of the voice information. The generation, transmission, and receipt of the voice information is described with reference to a transmission time process of FIG. 3, a reception time process of FIG. 4, and a relay time process of FIG. 5. The processes are performed by the navigation device 11, and the voice information, which includes the voice message and the additional information, is simply referred to as a message in the following.

<Transmission Time Process>

Figure 3:
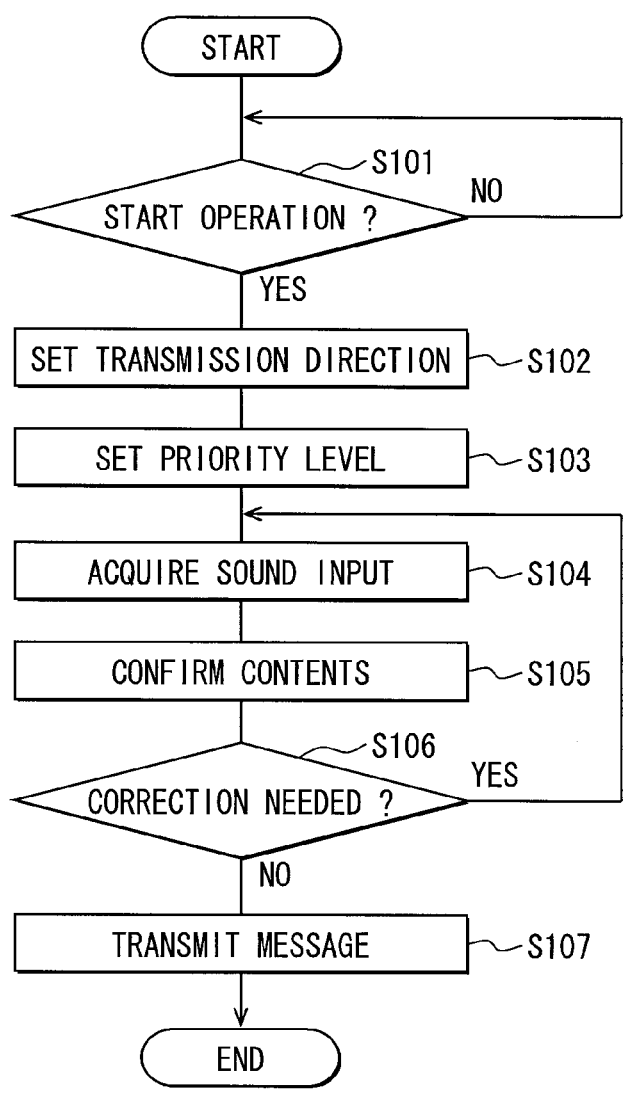
FIG. 3 is a flowchart of a transmission time process.

With reference to FIG. 3 the navigation device 11 determines whether a start operation is inputted at S101. The start operation is an operation of the SW 14 by the vehicle driver. In this case, because the hands-free function is provided by the navigation device 11, the operation on the SW 14 may be replaced with other operations, such as an input of a voice command by the driver, uttering "vehicle-to-vehicle communication", or a selection of the vehicle-to-vehicle communication from a command menu, for starting the transmission time process.

The navigation device 11 waits till the start operation is inputted (S101:NO). When the start operation is inputted (S101:YES), the navigation device 11 sets a transmission direction based on an utterance of the driver of the subject vehicle 17 at S102. In this case, the transmission direction is set by a sound input of the driver. For instance, when the driver speaks "Transmission to the lead vehicle 17," or "Transmission to the following vehicle 17," the sound input is recognized by a voice recognition process. The navigation device 11 then extracts the word indicating a direction, and sets the transmission direction according to the word extracted. The transmission direction may be spoken as a very short word of "a lead vehicle," or may even be spoken as "a leader".

The navigation device 11 then sets the priority level based on the sound input (S103). The priority level may be set to a high level when the driver utters, for example, "Right now" or "high priority", which are inputted and recognized. The priority level may be set to a low level when the driver utters, for example, "Later" or "low priority", which are inputted and recognized. The navigation device 11 may perform S102 and S103 in parallel, instead of in sequence. Specifically, when the driver speaks a series of words, e.g., "Transmit to the lead vehicle, in high priority," the priority and the transmission direction may be simultaneously set.

Further, at S102, the navigation device 11 sets the safety attribute to the information, i.e., whether or not the information is concerned with safety of the vehicle 17. For example, when the driver says a word or a phrase, such as "the lead vehicle is dangerous", the navigation device 11 may set the safety attribute to the added information based on the word "dangerous" or even "danger." The navigation device 11 may also set the priority level information in such manner.

Also, the additional information of the message may include information indicating that the voice information is to be forwarded or relayed to other vehicles 17. For instance, the driver of the subject vehicle 17 may want information regarding travel congestion or an accident to be relayed to other following vehicles 17. Accordingly, a relay category indicating that the message is to be forwarded may also be provided in the additional information, and may be set when the driver utters a word or a phrase, such as "all of the following vehicles".

The navigation device 11, at S104, acquires the sound input of the driver, which includes certain information that the driver wishes to convey. The sound input of the driver is referred to as the voice message. The navigation device 11 converts the voice message acquired to have a text data format. The navigation device 11 then outputs a voice reading the text data from the speaker 13 at S105 to confirm the voice to text data conversion at S106. After the navigation device 11 receives a no-correction instruction from the driver either by a voice input command or a press down of a SW 14 (S106:NO), it transmits the message, which includes the voice message and the added information, toward a specified transmission direction at S107. When correction of the voice to text data conversion is required (S106:YES), the navigation device 11 returns to S104 to perform the conversion again.

In such manner, the navigation device 11 transmits the message (i.e., the voice information) based on the sound input of the driver, to the vehicle(s) 17 in front of or behind of the subject vehicle 17.

<Reception Time Process>

Figure 4:
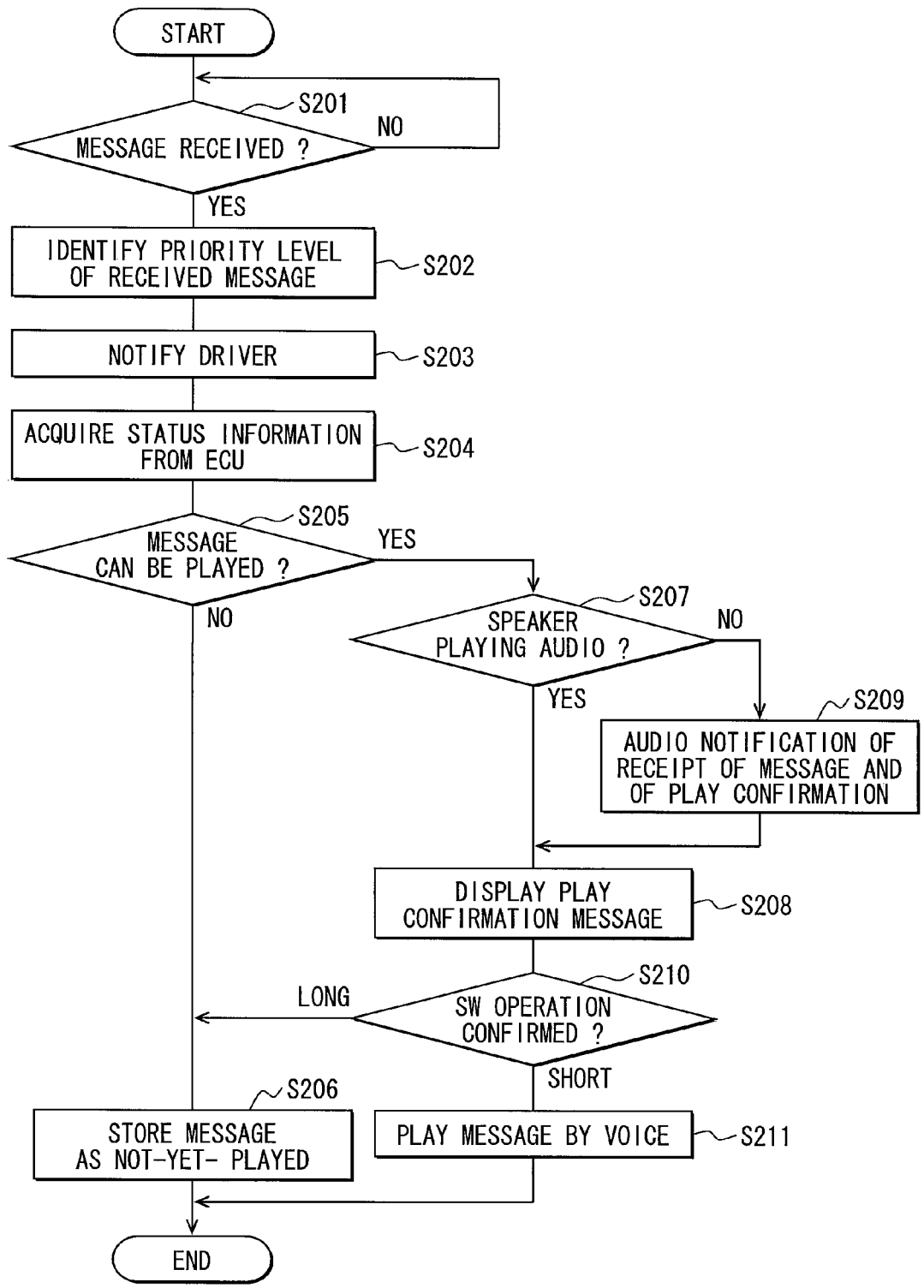
FIG. 4 is a flowchart of a reception time process.

With reference to FIG. 4, the navigation device 11 waits for the message (i.e., voice information) in S201. When the message is received (S201:YES), the navigation device 11 determines the direction from which the message was transmitted, determines the voice message by extracting the text data from the message, and determines the added information provided in the message. The navigation device 11 determines the priority level specified in the added information at S202. Further, the navigation device 11 notifies the driver of the reception of the message at S203 by displaying the reception of the message on a screen of the display unit (i.e., on screen display). The notification displayed may be "Message received." The navigation device 11 also displays the priority level on the screen, together with the message.

The navigation device 11 then acquires status information from the ECU 18 at S204. The status information indicates whether a voice recognition process is currently being performed for a handsfree call or a voice guidance. In other words, status information indicates whether the text to sound function is currently being used. Based on the status information, the navigation device 11, at S205, determines whether the voice message should be played. When the navigation device 11 determines that the voice message cannot be played (S205:NO), the message received is stored as not-yet-played at S206. Further, the message stored as not-yet-played can be played later.

In contrast, when the navigation device 11 determines that text to sound function is available to play the voice message (S205:YES), the navigation device 11, at S207, then determines whether the speaker 13 is playing audio, such as music. If the speaker 13 is being used (S207:YES), the navigation device 11 displays a play confirmation message at S208 on the display unit. For example, the play confirmation message may be displayed as a set phrase of "Press SW 14 for a short time to play the message received. Press SW 14 for a long time for storing the message without playing it" or the like.

On the other hand, when the speaker is not playing audio (S207:NO), the navigation device 11 provides an audio notification of the receipt of the message and of the play confirmation message at S209, and proceeds to S208 to display the play confirmation message (S208).

In this case, the driver who has received the message determines whether to play the voice message in view of the priority level displayed on the screen, and operates the SW 14 to input an instruction that specifies either to play or not play the voice message. At S210, the navigation device 11 confirms the operation (i.e., a press time) of the SW 14, either to proceed to S206 for storing the message as not-yet-played when the press time of the SW 14 is determined as a long press (S210:LONG) or to proceed to S211 for playing the voice message via the text to sound function when the press time of the SW 14 is determined as a short press (S210:SHORT). In such manner, the navigation device 11 plays the voice message according to an operation by the driver based on the priority level.

<Relay Time Process>

Figure 5:
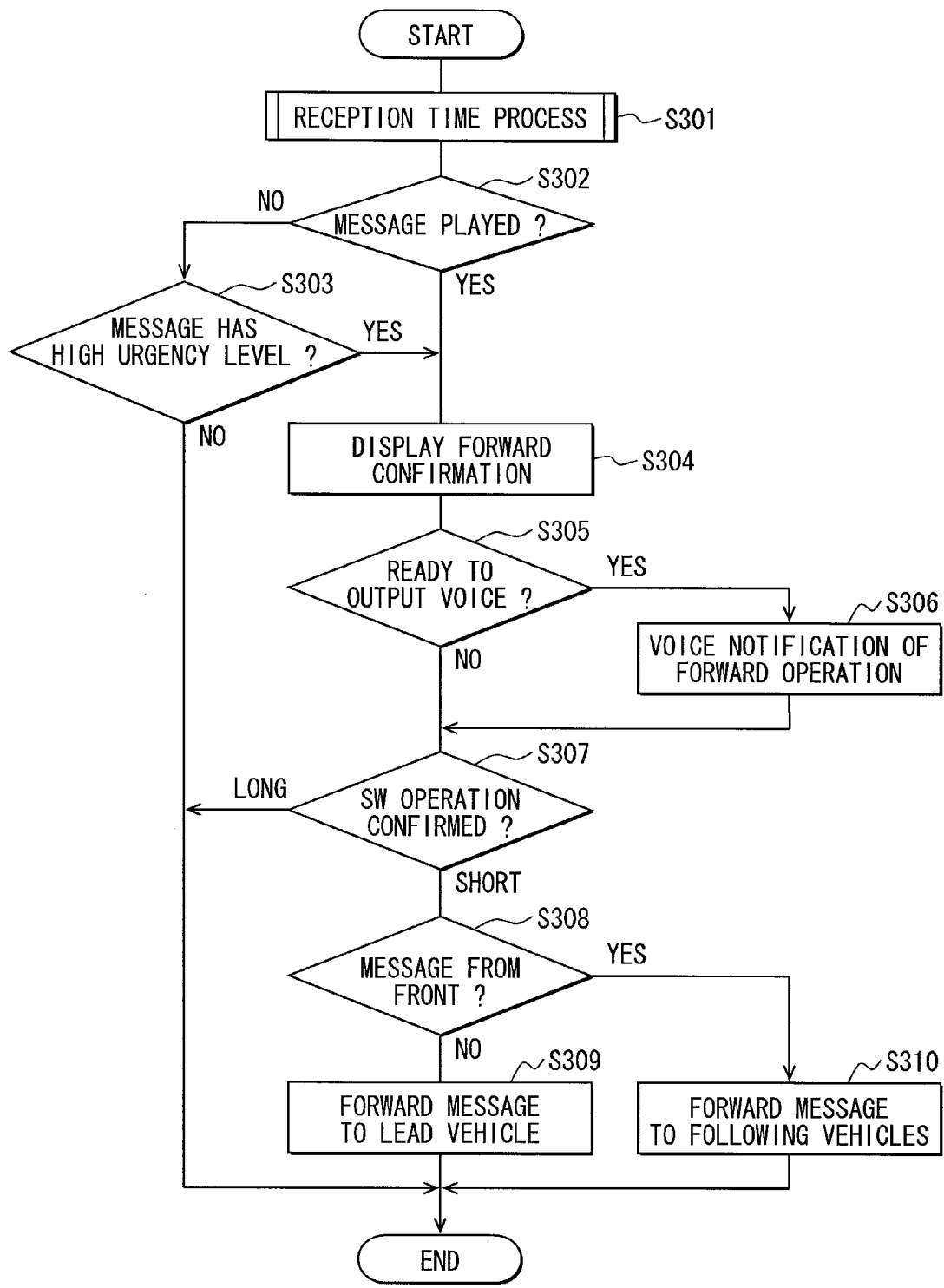
FIG. 5 is a flowchart of a relay time process.

With reference to FIG. 5, the navigation device 11 forwards the message by performing a relay time process of FIG. 5. The message may be relayed by, for example, transmitting the message toward the rear direction of the subject vehicle after receiving the message from the lead vehicle 17, which is in front of the subject vehicle 17. By forwarding the message to the following vehicles 17, the message, which may be information regarding traffic congestion or an accident, can effectively be transmitted to the following vehicles 17, which are traveling in the same direction as the subject vehicle.

The navigation device 11 at S301, performs a process that is the same as the reception time process of FIG. 4. The navigation device 11 then, at S302, determines whether it played the message in the reception time process of S301. Such determination is required for determining whether to forward the received message or not. Specifically, the received message at S301 may be transmitted from the lead vehicle only for the subject vehicle, or may also be for the following vehicles 17 of the subject vehicle. Therefore, the navigation device 11 first determines whether the message has already been played.

When the navigation device 11 has not played the message (S302:NO) (i.e. stored as not-yet-played), the navigation device 11 determines whether the message has a high urgency level at S303. The urgency level may indicate whether the message should be relayed or not. In other words, the urgency level is used as a threshold for determining whether to relay the received message. When the voice message has not been played, the driver of the receiving side may not know the content of the voice message and therefore may not know whether the message received is only for the subject vehicle 17 or if it should be forwarded. For instance, when the voice message is in regards to travel congestion or an accident, which is ahead of the subject vehicle 17, such message may be intended for the subject vehicle 17 and other vehicles 17.

Therefore, when the voice message has not been played (S302:NO), the navigation device 11, at S303, determines the urgency level of the received message based on the priority level and other information categories, such as the safety attributes. For example, the navigation device 11 determines that the received message has a high urgency level when the priority level of the received message is high, or when the received message has an information category indicating "Relay-needed" setting. The navigation device 11 determines that the received message does not have a high urgency level (i.e., has a low urgency level) when the priority level of the received message is low, or when the received message has an information category indicating "Greeting" setting.

When the urgency level is low (S303:NO), the navigation device 11 determines that the message does not have to be relayed (i.e., forwarded) and the process is finished.

On the other hand, when the urgency level is high (S303:YES), or when the navigation device 11 has played the message, so that the driver is aware of the content of the message (S302:YES), the navigation device 11, at S304, displays a confirmation message asking the driver whether the message should be forwarded by providing an on screen display of the confirmation message. The on screen display of the confirmation message may be "Press SW 14 for a short time to transfer the message. Press SW 14 for a long time to not transfer the message."

The navigation device 11 then determines whether a voice output can be provided at S305. The voice output ready condition indicates that the navigation device 11 is in a condition that fulfills both of the condition of S205 and the condition of S207 of FIG. 4. Specifically, the text to sound function is available (S205:YES) and that no audio is being played (i.e., speaker 13 is available) (S207:YES), thereby allowing the navigation device 11 to play the confirmation message via the speaker 13.

When the navigation device 11 is in the voice output ready condition (S305:YES), it notifies the driver, via a sound output, of the message that is to be forwarded, and plays the confirmation message at S306. Subsequently, at S307, the operation of the SW 14 is confirmed. On the other hand, when the navigation device 11 is not in the voice output ready condition (S305:NO), the process proceeds directly to S307.

When the SW 14 is pressed for a long time (S307: LONG PRESS), the navigation device 11 finishes the process, determining that the message should not be forwarded. When the SW 14 is pressed for a short time (S307:SHORT PRESS), the navigation device 11, at S308, determines whether the message came from the front direction. If the voice message did not come from the front direction (S308: NO), then it was received from the rear direction and the navigation device 11 forwards the message to the lead vehicle 17 (i.e., front direction) at S309.

On the other hand, if it is determined that the message came from the front direction (S308:YES), the navigation device 11 forwards the message toward the following vehicles 17 (i.e., rear direction) at S310.

In such manner, by forwarding the message toward a different direction that is different from the receiving direction, the navigation device 11 relays the message based on the contents of the message.

According to the present embodiment, the following advantages are achieved.

The vehicle-to-vehicle communication device 10 generates voice information including a voice message and added information regarding the delivery of the voice message, and transmits the voice information in one direction of the subject vehicle. Further, when the vehicle-to-vehicle communication device 10 receives the voice information transmitted by the other vehicles, it outputs the voice message based on the added information in the received voice information. In such manner information is exchanged between the subject vehicle and the other vehicle by transmitting the sound input of the driver from the subject vehicle to the other vehicle and vise versa. Therefore, the appropriate information suitable for a current travel situation and having desired contents of the speaker is transmitted.

The vehicle-to-vehicle communication only requires one protocol for transmitting and receiving the voice information. In other words, a voice information exchange function is sufficient for such communication, thereby allowing the navigation device 11 to have a simple configuration. Further, by using the voice recognition function and the text read function, both of which are provided as standard functions of a general navigation device, the vehicle-to-vehicle communication function of the present disclosure can be easily realized or implemented.

The vehicle-to-vehicle communication device 10 displays the added information on the display unit for notifying the driver of the vehicle of the voice message. Also, based on a response to the notification, the voice message is read per a text to sound function and provided through the speakers. In such manner, the driver can determine whether to play the voice message based on the recognized importance of the received voice information (i.e., based on the added information), and the received voice information is appropriately and effectively utilized.

Further, the voice message is played according to the input operation of the driver, i.e., according to the intention of the driver, thereby decreasing nuisance experienced by the driver on the receiving side.

The voice information is generated by a sound input into the voice input unit. In other words, the voice information to be transmitted to the other vehicle is generated without forcing the driver of the vehicle to perform a text message input operation.

Further, the sound input has, by itself, the desired content of the information to be transmitted. Accordingly, in the transmission or reception process, most of the required operations are performed by an input of a voice command. For instance, per the transmission process, generation of the content of the voice information as well as the instruction for specifying the transmission direction, are provided via a voice command. Also, per the reception process, instructions related to playing the voice message are also provided by a voice command. The manual operation of the driver is configured to be performable only as a long or a short press operation of the SW 14, allowing the navigation device 11 to determine a difference therebetween.

Therefore, by the utilization of a voice input interface and the SW 14, the voice information having the desired contents is generated and transmitted without searching for a desired message in the database from among the prepared messages, nor without gazing at the display unit for the input of the text message. In other words, no complicated operation is required for the transmission and reception of the message by using the vehicle-to-vehicle communication device 10, thereby improving the safety of the occupants of the vehicle.

The vehicle-to-vehicle communication device 10 sets, in the added information of the voice information, the output timing of the voice message from the sound output unit on the receiving side. Such setting allows the receiving side of the voice information to determine the importance of the transmitted information.

Further, the vehicle-to-vehicle communication device 10 determines whether the sound input includes information regarding the safety of the vehicle 17, and sets, as the added information, the determination result of such safety related matter. In such manner, without playing the voice information on the receiving side, the vehicle-to-vehicle communication device 10 of the receiving side can determine whether the received voice information needs to be attended (i.e., addressed).

Further, since the safety attribute regarding the safety of the vehicle 17 is set in the added information, information regarding the safety of the vehicle 17 is immediately provided via a sound input. That is, the safety related information is quickly addressed. Further, the voice information is categorized according to various attributes such as the safety attribute, the "Relay-needed" attribute, which are different from the priority level. Accordingly, the response to the voice information is changed according to the attribute setting in the information instead of according to the priority level. In such manner, the user's convenience is improved.

The voice information not yet played is stored as not-yet-played voice information. Therefore, the driver can play the stored voice information at any time when it is convenient for him/her.

Further, by identifying the transmission direction of the received voice information, the vehicle-to-vehicle communication device 10 transmits the received voice information in a different direction that is different from the identified receiving direction. For example, information, such as an accident or traffic congestion, may preferably be transmitted not only to the receiving vehicle 17, but also to the following vehicles of the receiving vehicle 17. Therefore, the received information may be transmitted in a different direction that is different from the receiving direction, for quickly relaying and sharing urgent information among the vehicles 17.

Since the transmission power of the front transceiver 15 and the transmission power of the rear transceiver 16 are changeable, the transmission power may be suitably changed according to the travel situation, for enabling a selective transmission of the information only to the desired vehicles, when the vehicles are traveling in, for example, an urban environment.

Other Embodiments

Although the current disclosure has been fully described in connection with the preferred embodiment thereof with reference to the accompanying drawings, it is to be noted that various changes and modifications described in the following will become apparent to those skilled in the art.

In one embodiment, even when the output timing is set as the added information, the output of the voice message, via a voice reading the voice message, is enabled according to the operation of the SW 14 by the vehicle driver. Such configuration prevents interruption of a conversation occurring in the vehicle among the vehicle occupants, since automatic output of the voice information in the middle of the conversation may be annoying.

On the other hand, based on an assumption that the sender of the message has good intentions, the information having a "Right-now" output timing attribute (i.e., the high priority information) may be provided immediately after the reception without waiting for the operation of the driver.

In particular, even when the voice information has been received, or even when the information has the high priority setting, the reception of such information is in vain if the received information will not be utilized. Therefore, when, for example, the vehicle 17, which may be a truck, has a truck load that is about to come off the truck, in order to quickly respond to such situation, the voice information having the "Right-now" output timing attribute may be immediately provided to the driver after the reception of the voice information. Further, when the safety attribute regarding the safety of the vehicle 17 is set as the added information, the voice message may be outputted without waiting for the operation of the driver of the receiving side vehicle.

Further, in the event the voice information includes forbidden word(s) or phrases, which may be predetermined or may be set by the user, the voice information may be suppressed or, in other words, not generated. Specifically, during the generation of the voice information or during the output of the voice message by the receiving vehicle, the voice information and/or the output of the voice message that include the forbidden word(s) or phrase, may be suppressed from being generated or played. For instance, if the driver transmits the voice information including forbidden words, such information may be a nuisance for the driver of the receiving vehicle. Therefore, by suppressing the voice message of the voice information from being played, possible irritation and negative reaction felt by the driver of the receiving vehicle is avoided.

In one embodiment, the high urgency level of the received message (S303:YES) leads to the operation for determining whether to transmit the message or not in S304 of the relay time process of FIG. 5. However, when the urgency level is high, the relay of the message may be performed without requiring the operation of the driver. That is, the YES branch of S303 of FIG. 5 may proceed to S308.

For instance, when the subject vehicle receives a message having a high urgency level from a lead vehicle, which sent the voice information due to, for example, an accident in front of the lead vehicle, the driver of the subject vehicle may postpone the transmission operation of such message or the driver of the subject vehicle may not even notice the reception of such message from the lead vehicle.

Therefore, by configuring the message having the high urgency level to be relayed without the operation of the driver of the subject vehicle, the message having the high urgency level can be appropriately forwarded to the following vehicles, thereby providing the drivers of the following vehicles sufficient notice.

The priority level and the safety attribute shown in one embodiment of the present disclosure are, for the illustration purposes. That is, the vehicle-to-vehicle communication device 10 of the present embodiment can handle various situations, such as a transmission of an advance notice, to the following vehicles 17 regarding a slow down before a traffic congestion on the highway during a high speed travel of the vehicle.

The front transceiver 15 and the rear transceiver 16 are described in one embodiment of the present disclosure for illustration purposes. For instance, the directivity of a transmitter may be configured to be changeable, or a reception direction of a receiver may be configured to be identifiable for achieving the same result.

In one embodiment of the present disclosure, the output of the received message is performed as display only output if the audio is being played as shown in S207 of FIG. 4. However, the reception of such message having the high urgency level may be notified even when the audio is being replayed. In such case, the output of the reception of the high urgency message during the replay of the audio may somewhat deteriorate the user convenience or the user comfort. However, the safety of the vehicle may be improved by the quick output/notification of such message at the sacrifice of the output/notification of the convenience/comfort.

Such changes and modifications are to be understood as being within the scope of the current disclosure as defined by the appended claims.

Based on the foregoing, the vehicle to vehicle communication device sets, as the added information, an output timing of when the speaker 13 (i.e., sound output unit) of the receiving vehicle should output the voice message included in the voice information. The speaker 13 then outputs the voice message in the received voice information according to the output timing of the voice information received.

For instance, when urgent information is transmitted, the output timing of such information is set as "Right-now," and, when non-urgent information is transmitted, the output timing of such information is set as "Later." Accordingly, the voice information having the "Right-now" setting is determined to have a high priority, and the voice information having the "Later" setting is determined to have a low priority. By setting the output timing of the voice information before transmission, the receiving vehicle can readily determine the importance of the information.

In addition, the navigation device (i.e., a voice information generation unit) determines whether the voice message includes safety related information regarding the vehicle, and sets a safety attribute based on such determination as the added information. The sound output unit outputs the voice message according to the safety attribute that is included in the voice information.

For instance, a burned-out taillight may be a violation of a law and a safety hazard, and should be quickly addressed. On the other hand, providing a greeting or extending gratitude to another driver is not a safety hazard, and thus does not have to be immediately addressed. Thus, the added information is used to indicate whether the message relates to the safety of the vehicle, which assists the receiving vehicle in determining whether such message should be immediately addressed.

In addition, the communication device provides a notification of the added information that is included in the voice information, and the user provides an input operation regarding whether the voice message should be played. The sound output unit outputs the voice message according to an operation of an operation input unit (i.e., SW 14).

For example, when the voice information is received during an execution time of a sound recognition function and/or a sound-related processing function, (e.g., at a time of a hands-free call or a voice guidance), the voice information may interfere with the hands-free call or the voice guidance if the voice message is played just after the reception of the voice information. On the other hand, if the voice message having an urgent status is not provided, the urgent information may be ignored and may cause a safety hazard. Therefore, to notify the driver of the importance of the voice information, a notification regarding the added information may be provided to the driver, thereby allowing the driver to determine whether such voice message should be played. In such manner, the voice information is appropriately and effectively utilized.

What is claimed is:

1. A vehicle-to-vehicle communication device disposed in a vehicle for transmitting and receiving information from an other vehicle, the vehicle-to-vehicle communication device comprising:
a microphone that receives an utterance spoken by a user in the vehicle and generates a voice message based on the utterance spoken by the user;
a processor configured to generate voice information in response to the voice message which is generated by the microphone, the voice information includes both (i) the voice message generated by the microphone and (ii) added information regarding an output of the voice message, the added information regarding plural levels of a priority setting of the output of the voice message is automatically generated based on contents extracted from the voice message, the plural levels of the priority setting including at least a high priority level setting and a low priority level setting;
a transceiver transmitting the voice information generated by the processor in one direction of the vehicle, the one direction regarding the transmission of the voice information is determined based on the contents extracted from the voice message; and receiving the voice information transmitted by a transmission unit of the other vehicle; and
a speaker outputting the voice message included in the voice information received by the transceiver based on the added information of the voice information received by the transceiver,
the processor is further configured to output the voice message based on the priority setting identified in the added information in the voice information, the output of the voice message is (i) for the high priority level setting, immediately performed without waiting for an operation of a user, and (ii) for the low priority level setting, performed according to the operation of the user.

2. The vehicle-to-vehicle communication device of claim 1, wherein
the processor automatically sets, as the added information, an output timing of when the voice message included in the voice information to be transmitted by the transceiver is to be outputted based on the contents of the voice message, and
the speaker outputs the voice message according to the output timing of the voice information received by the transceiver.

3. The vehicle-to-vehicle communication device of claim 1, wherein
the processor automatically determines whether the voice message includes safety related information of the vehicle based on the contents of the voice message, and sets the safety attribute in the added information based on the determination result as the added information, and
the speaker outputs the voice message according to the safety attribute included in the voice information received by the transceiver.

4. The vehicle-to-vehicle communication device of claim 1, wherein
the processor is further configured to provide a notification of the added information included in the voice information received by the transceiver; and
the vehicle-to-vehicle communication device further comprises a switch receiving an input operation in response to the notification by the processor for determining the output of the voice message of the voice information received, wherein
the speaker outputs the voice message according to the input operation from the switch.

5. The vehicle-to-vehicle communication device of claim 1, wherein
the transceiver identifies a receiving direction of the voice information, and
the transceiver forwards the voice information that is received by the transceiver in a direction that is different from the receiving direction.

6. The vehicle-to-vehicle communication device of claim 1, wherein the processor suppresses the generation of the voice information when the voice message includes at least one of a preset forbidden word and a user-specified forbidden word.

7. The vehicle-to-vehicle communication device of claim 1, wherein
the speaker suppresses the output of the voice message when the voice message is determined as including at least one of a preset forbidden word and an user-specified forbidden word.

8. The vehicle-to-vehicle communication device of claim 1, wherein
the transceiver of the vehicle mutually communicates with a transceiver of the other vehicle;
the transceiver of the vehicle mutually communicates with the transceiver of the other vehicle; and
a transmission range of the transceiver is an inter-vehicle distance for traveling.

9. The vehicle-to-vehicle communication device of claim 1, wherein
the processor generates the voice message in the voice information by converting the spoken voice message input to the microphone to a text data format, the voice information which is transmitted to the other vehicle includes the voice message which is in the text data format; and
the processor converts the voice message in the voice information which is received by the transceiver from the other vehicle, by using a text-to-speech function, and the processor provides the voice message which is converted to speech to the speaker to output the voice message as sound.

10. The vehicle-to-vehicle communication device of claim 1, wherein
the received voice message is relayed to one of a lead vehicle and a following vehicle, according to an urgency level of the received voice message.

11. The vehicle-to-vehicle communication device of claim 10, wherein
when the urgency level of the received voice message is determined to be high, the relay to the one of the lead vehicle and the following vehicle is performed without requiring an operation of a driver of the vehicle.

12. The vehicle-to-vehicle communication device of claim 1, wherein
the received voice message is relayed to one of a lead vehicle and a following vehicle, according to a location of an emergency.

13. The vehicle-to-vehicle communication device of claim 1, wherein
the transceiver comprises a short range front transceiver provided on a front part of the vehicle, and a short range rear transceiver provided on a rear part of the vehicle, configured to transmit the voice information in the one direction of the vehicle which was determined based on the contents extracted from the voice message.

14. The vehicle-to-vehicle communication device of claim 1, wherein
the transceiver comprises at least one short range transceiver provided on the vehicle that transmits the voice information in the one direction of the vehicle which was determined based on the contents extracted from the voice message.

15. The vehicle-to-vehicle communication device of claim 4, wherein
the notification of the added information included in the voice information received by the transceiver is provided by being displayed on a screen display, or is provided by being output from the speaker.

* * * * *